United States Patent [19]

Miyairi et al.

[11] Patent Number: 5,648,106
[45] Date of Patent: Jul. 15, 1997

[54] INJECTION MOLD FOR MOLDING INFORMATION RECORDING DISCS

[75] Inventors: Kazuki Miyairi; Akira Iijima, both of Hanishina-gun, Japan

[73] Assignee: Nissei Plastic Industrial Co., Ltd., Nagano-ken, Japan

[21] Appl. No.: 563,440

[22] Filed: Nov. 28, 1995

[30] Foreign Application Priority Data

Nov. 30, 1994 [JP] Japan .................................. 6-321774

[51] Int. Cl.$^6$ .................................................. B29C 45/28
[52] U.S. Cl. .......................... 425/186; 425/191; 425/810; 264/107
[58] Field of Search .............................. 264/106, 107, 264/DIG. 67; 425/186, 191, DIG. 218, 810

[56] References Cited

U.S. PATENT DOCUMENTS

| 4,021,175 | 5/1977 | Wuhrmann et al. | 425/191 |
| 4,135,961 | 1/1979 | Yoshizawa et al. | 425/DIG. 218 |

Primary Examiner—Jay H. Woo
Assistant Examiner—Minh-Chau T. Pham
Attorney, Agent, or Firm—Weingarten, Schurgin, Gagnebin & Hayes LLP

[57] ABSTRACT

An improved injection mold for molding an information recording disc is provided. It includes a holder frame fitted to a mold fitting plate, a mirror platen member for a stamper held in the holder frame, a tubular inner periphery holder fitted into a central hole bored through the mirror platen member and provided with a threaded portion on the outer periphery thereof near the leading end, a pilot bush and an anchor nut for holding the inner periphery holder, and is characterized in that said inner periphery holder is provided with a screw section having a plurality of intermittently disposed threaded portions projecting forwardly from the leading end thereof and said pilot bush is provided at the leading end thereof with a locking flange having at areas close to the center thereof through holes for allowing respective threaded portions to run therethrough and project further while the mold fitting plate is provided in the inside with an rotatable anchor nut so that the inner periphery holder can be firmly secured to the mold fitting plate through screwed engagement of the anchor nut and the threaded section can be made to abut the corresponding surface of the locking flange.

1 Claim, 2 Drawing Sheets

INJECTION MOLD FOR MOLDING INFORMATION RECORDING DISCS

BACKGROUND OF THE INVENTION

1. Field of the Invention

This invention relates to a mold to be suitably used for injection molding of a disc such as an information recording disc.

2. Background Art

Known injection mold of the above identified type typically comprise a holder frame 2 fitted to an outer peripheral areas of the front surface of a mold fitting plate 1 and a mirror platen member 4 for a stamper 3 held in the holder frame 2 so that the stamper 3 arranged on the front surface of the mirror platen member 4 is carried by a tubular inner periphery holder 5 fitted to a central portion of the mirror platen member 4 and provided with a threaded area 5a on the outer periphery at and near the leading end thereof and an outer periphery holder 6 arranged on a stepped portion of the inside of the opening of the holder frame 2.

The inner periphery holder 5 is secured in position by placing a sprue in a central hole bored around the axis of the mirror platen member 4 from the rear side of a pilot bush 7 arranged on the front end of said central hole and introducing the inner periphery holder 5 into an annular space formed around the outer periphery of the pilot bush 7 from the front side. A locking flange 7a is integrally formed with the pilot bush 7 at the rear end thereof and the mirror platen member 4 is provided on the rear side thereof facing the locking flange 7a with a recess 9 for receiving an anchor nut 8.

Said anchor nut 8 is realized in the form of a bevel gear and capable of being rotated from the outside by means of a gear shaft 10 so that the anchor nut 8 may be brought into engagement with the threaded area 5a of the inner periphery holder 5 by rotating the gear shaft 10 to attract the inner periphery holder 5 toward the locking flange 7a until the leading end 5b of the inner periphery holder 5 abuts the locking flange 7a and the inner periphery holder 5 is placed axially in position.

With a known injection mold having the above described arrangement for anchoring the inner periphery holder, a gap is inevitably required between the anchor nut and the mirror platen member and the locking flange in order to smoothly rotate the anchor nut. Although this gap is very small, it can cause the mirror platen member to be deformed at the central portion under the pressure of resin injected for molding to produce a molded product that is slightly thicker at a central portion thereof than at the remaining portions. Particularly in the case of a product having a small diameter, the disadvantage of such a differentiated thickness becomes unnegligble because the central portion takes a significant ratio in the overall surface area.

Additionally, for the initial operation of assembling the mold and for repairing the surface of the mirror platen member, a single inner periphery holder is often commonly used for a number of molds. If such is the case, the clearance between the surface of the mirror platen member and the stamper holding edge of the tail end of the inner periphery holder has to be regulated each time the latter is applied to a new mold. The operation of regulating the clearance is typically carried out by scraping the surface of the flange for receiving the leading end 5b of the threaded area 5a of the inner periphery holder if the clearance is too large because the axial length of the inner periphery holder is to remain unchanged. Consequently, the clearance between the anchor nut and the mirror platen member is altered and hence requires a further regulating operation.

In view of the above problems, it is therefore the object of the invention to provide an injection mold that can prevent any deformation of the mirror platen member due to the gap between the anchor nut and the mirror platen member and the locking flange from taking place by securing the inner periphery holder to the mold fitting plate and allows easy regulation of the above identified clearance.

SUMMARY OF THE INVENTION

According to the invention, the above object is achieved by providing an injection mold for molding an information recording disc comprising a holder frame fitted to an outer peripheral areas of the front surface of a mold fitting plate, a mirror platen member for a stamper held in the holder frame, a tubular inner periphery holder fitted into a central hole bored through the mirror platen member and provided with a threaded portion on the outer periphery thereof at and near the leading end, a pilot bush and an anchor nut for engagedly holding the inner periphery holder, wherein said inner periphery holder is provided with a screw section having a plurality of intermittently disposed threaded portions projecting forwardly from the leading end thereof to form abutting edges therebetween and said pilot bush is provided at the leading end thereof with a locking flange having at areas close to the center thereof through holes for allowing respective threaded portions to run therethrough and project further while the mold fitting plate is provided in the inside with an rotatable anchor nut so that the inner periphery holder can be firmly secured to the mold fitting plate through screwed engagement of the anchor nut and the threaded section and said abutting edges can be made to abut the corresponding surface of the locking flange.

With a mold according to the invention and having a configuration as described above, the inner periphery holder is made to slide along the outer periphery of the pilot bush with the screw section leading ahead and introduced into an annular space formed around the outer periphery of the pilot bush until the threaded portions of the screw section move through the respective through holes and get to the corresponding end of the anchor nut of the mold fitting plate. Then, the inner periphery holder is pushed further, while rotating the anchor nut, so that they come into screwed engagement and the inner periphery holder is moved until the abutting edges of the inner periphery holder abut the corresponding surface of the locking flange and the inner periphery holder is firmly secured to the mold fitting plate. Under this condition, the mirror platen member is carried by the mold fitting plate by way of said inner periphery holder so that it can safely bear the pressure of injected resin and does not give rise to any deformation.

DETAILED DESCRIPTION OF THE PREFERRED EMBODIMENTS

Figure 1:
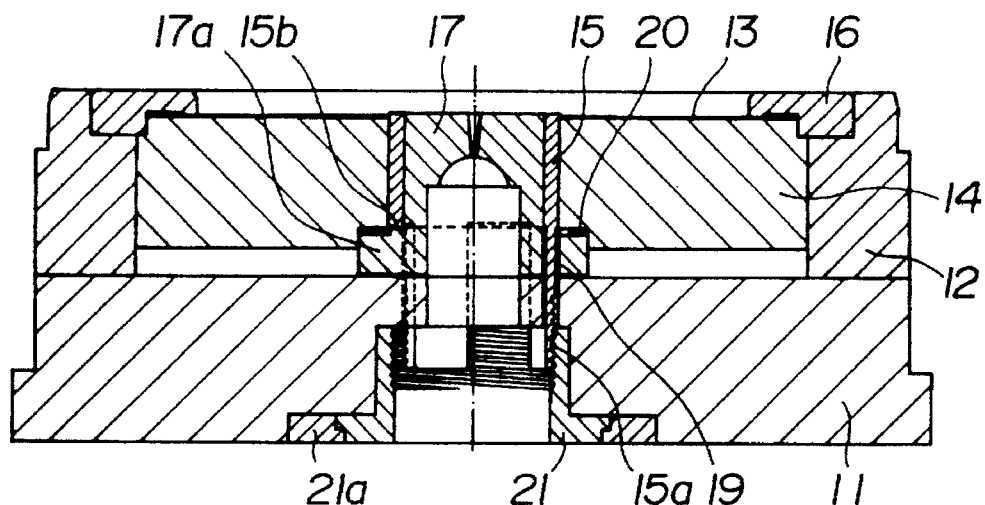
FIG. 1 is a schematic longitudinal cross sectional view of an embodiment of injection mold for molding an information recording disc according to the invention and showing the stationary platen side thereof.
Figure 2:
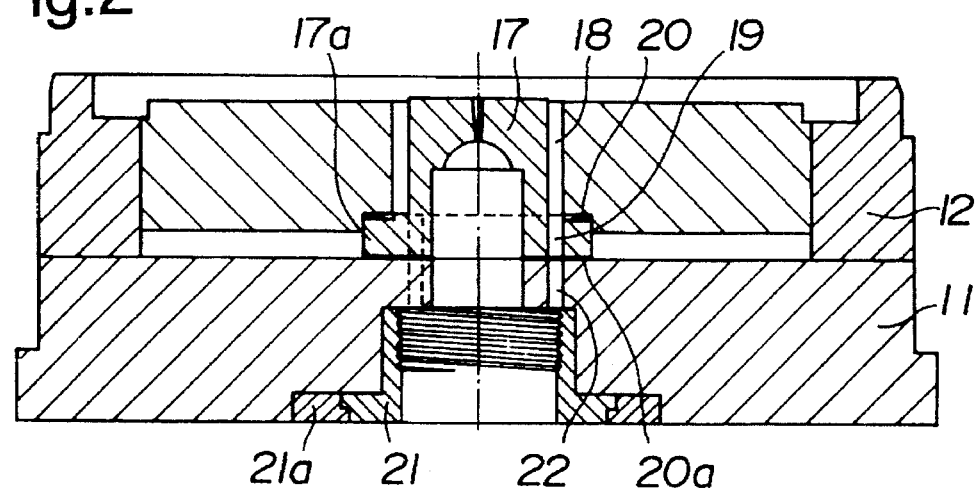
FIG. 2 is a schematic longitudinal cross sectional view similar to FIG. 1 but showing the embodiment from which the stamper and the inner periphery holder are removed.

Now, the present invention will be described in greater detail by referring to the accompanying drawings that illustrate preferred embodiments of the invention.

Referring to FIGS. 1 through 5, there are shown a mold fitting plate 11 and a holder frame 12 having a circular inner peripheral edge and fitted to an outer peripheral areas of the front surface of the mold fitting plate 11. The holder frame 12 holds in the inside a mirror platen member 14 for a stamper 13 so that the stamper 13 arranged on the surface of the mirror platen member 14 is carried by an inner periphery holder 15 arranged with a pilot bush 17 in a central portion of the mirror platen member 14 and an outer periphery holder 16 fitted to a stepped portion of the inside of the opening of the holder frame 12.

Figure 4:
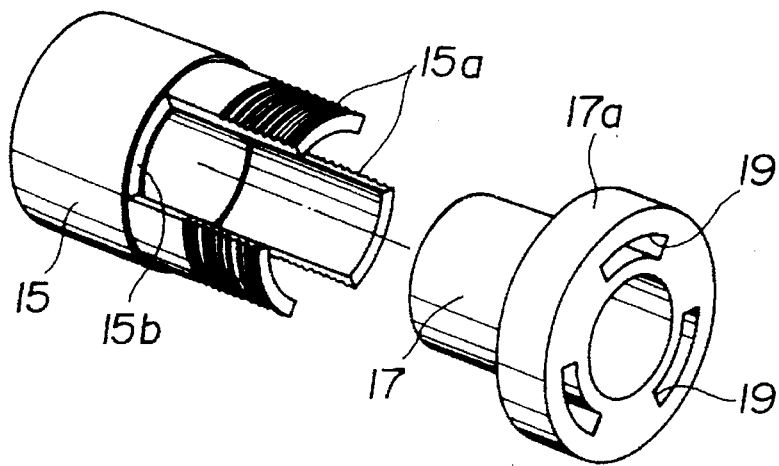
FIG. 4 is an exploded perspective view of the inner periphery holder and the pilot bush of an injection mold according to the invention.
Figure 5:
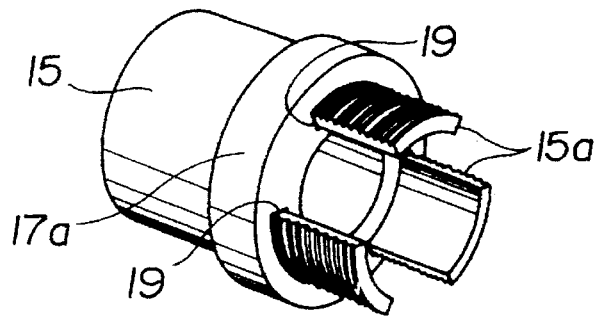
FIG. 5 is a perspective view of the inner periphery holder fitted into the pilot bush.
Figure 6:
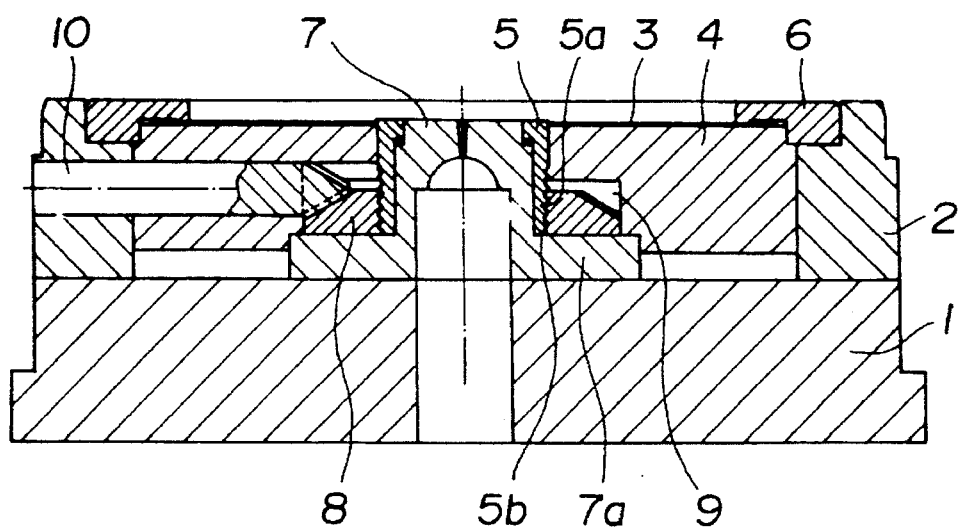
FIG. 6 is a schematic longitudinal cross sectional view of a known injection mold for molding an information recording disc showing the stationary platen side thereof.

As seen from FIGS. 4 and 5, said inner periphery holder 15 is a tubular member and provided with a screw section having a plurality of intermittently disposed threaded portions 15a projecting forwardly from the leading end thereof to form abutting edges 15b therebetween. The tail end of the inner periphery holder 15 is projecting from a central bore of the mirror platen member 14 to hold the inner peripheral edge of the stamper 13.

Said pilot bush 17 has a sprue having a diameter smaller than that of the central bore of the mirror platen member 14 and connected at the front end thereof to an internal nozzle and is integrally formed with a locking flange 17a arranged at the inner end thereof. The locking flange 17a has a diameter substantially equal to that of a circular recess formed at the rear end of the central bore of the mirror platen member and is provided at areas close to the center thereof through holes 19 for allowing respective threaded portions 15a of the inner periphery holder 15 to run therethrough and project further, the number of said through holes 19 being equal to that of the threaded portions 15a. A stepped portion is formed on the front surface of the locking flange 17a and outside the through holes 19 to receive a spacer 20.

The pilot bush 17 is introduced into the central bore of the mirror platen member 14 from the rear side until the locking flange 17a is engagedly received in the circular recess on the rear side of the mirror platen member 14 and firmly secured to the mirror platen member 14 to produce an annular space 18 between the pilot bush 17 and the mirror platen member 14.

A central bore is formed around the axis of the mold fitting plate 11 and a recess is formed around the central bore to face the pilot bush 17 and the mold fitting plate 11 is provided off and around the central bore with holes 22 corresponding to the respective through holes 19 of the locking flange 17a. The pilot bush 17 is placed in position in such a way that the locking flange 17a abuts the surface of said recess with a spacer 20a interposed therebetween, said spacer 20a being provided with holes corresponding to the through holes 19 of the locking flange 17a.

An annular anchor nut 21 having a flange at the outer end thereof is rotatably fitted into the central bore and held in position by a member 21a. Although not shown, the anchor nut 21 can be rotated from the outside.

Figure 3:
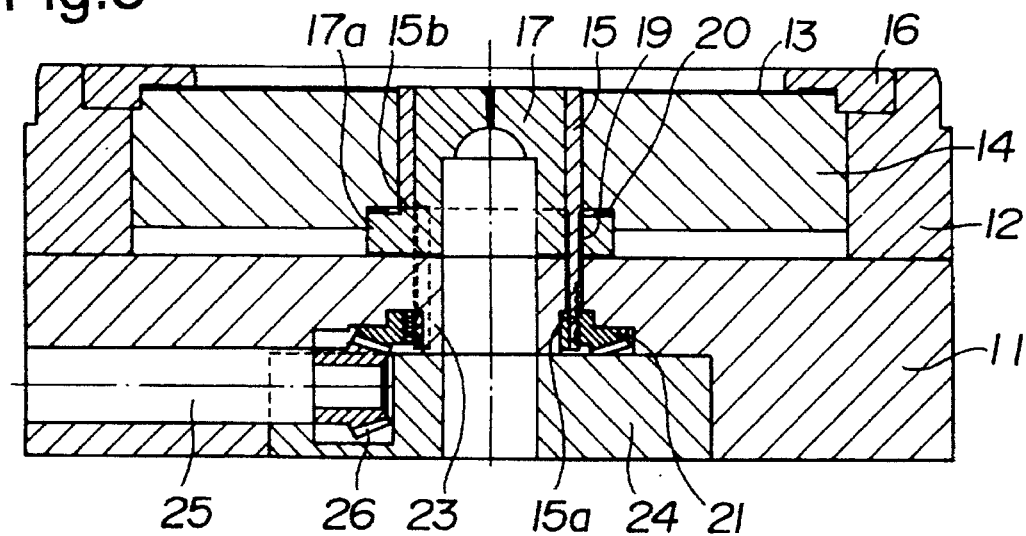
FIG. 3 is a schematic longitudinal cross sectional view of another embodiment of injection mold for molding an information recording disc according to the invention and showing the stationary platen side thereof.

In the embodiment of FIG. 3, the anchor nut 21 is realized in the form of a bevel gear and fitted to a short tubular shaft 23 projecting into the central bore of the mold fitting plate 11. At the same time it is rotatably carried by a closure member 24 and held in engagement with a gear 26 arranged at the front end of a rotary shaft 25 introduced from the lateral side of the mold fitting plate 11 so that it can be rotated from the outside.

With an injection mold having a configuration as described above, as the inner periphery holder 15 is introduced into the annular space 18 around the outer periphery of the pilot bush 17 with the screw section leading ahead, the threaded portions 15a is made to pass through the through holes 19 and the corresponding holes 22 and get to the corresponding end of the anchor nut 21. If the anchor nut 21 is rotated under this condition, while pushing the inner periphery holder 15 inwardly, the inner periphery holder 15 comes into screwed engagement with the anchor nut 21 and driven inwardly until the abutting edges 15b abut the locking flange 17a and hence the inner periphery holder 15 it is firmly secured to the mold fitting plate 11.

At the same time, the mirror platen member 14 is supported by the mold fitting plate 11 at the center thereof by way of the locking flange 17a and the locking flange 17a is tightly held in contact with the mirror platen member 14 and the mold fitting plate 11 as the inner periphery holder 15 is strongly driven into the mirror platen member 14 so that no gap can be produced between them and any risk of producing a deformed central portion of the mirror platen member is successfully eliminated.

[Advantages of the Invention]

As described above in detail, in an injection mold for molding an information recording disc according to the invention and having a configuration as described above, the inner periphery holder is provided with a screw section having a plurality of intermittently disposed threaded portions projecting forwardly from the leading end thereof to form abutting edges therebetween and the pilot bush is provided at the leading end thereof with a locking flange having at areas close to the center thereof through holes for allowing respective threaded portions to run therethrough and project further while the mold fitting plate is provided in the inside with an rotatable anchor nut so that the inner periphery holder can be firmly secured to the mold fitting plate through screwed engagement of the anchor nut and the threaded section and the abutting edges can be made to abut the corresponding surface of the locking flange. Thus, the risk of producing a deformed central portion of the mirror platen member observed in conventional injection molds of the type under consideration comprising an inner periphery holder arranged on the rear side of the mirror platen member is successfully eliminated. Additionally, the risk of producing a differentiated thickness on the molded product is also successfully eliminated from an injection mold according to the invention so that it can produce high precision information recording discs.

Finally, since the inner periphery holder is provided with abutting edges arranged between adjacently disposed threaded portions, the inner periphery holder can be precisely positioned in the axial direction and its position can be regulated by means of a spacer.

What is claimed is:

1. An injection mold for molding an information recording disc, said injection mold comprising:

a holder frame fitted to an outer peripheral area of the front surface of a mold fitting plate, a mirror platen member for a stamper held in the holder frame, a tubular inner periphery holder fitted into a central hole bored through the mirror platen member and provided with a threaded portion on the outer periphery of said tubular inner periphery holder at and near the leading end, a pilot bush and a rotatable anchor nut for engagedly holding the inner periphery holder, wherein:

said inner periphery holder is provided with a screw section having a plurality of intermittently disposed threaded portions projecting forwardly from the leading end of said inner periphery holder to form abutting edges between said inner periphery holder and said screw section of said inner periphery holder;

said pilot bush is provided at the leading end of said pilot bush with a locking flange having at areas close to the center of said locking flange through holes for allowing respective threaded portions of said inner periphery holder to run therethrough and project further;

said mold fitting plate is provided in the inside with said rotatable anchor nut so that the inner periphery holder can be firmly secured to the mold fitting plate through screwed engagement of the anchor nut, and the threaded section and said abutting edges of said inner periphery holder can be made to abut the corresponding surface of the locking flange.

* * * * *